Patented Nov. 12, 1940

2,221,353

UNITED STATES PATENT OFFICE 2,221,353

PROCESS FOR TREATING OIL WELLS

Donald A. Limerick, Oakland, and Howard C. Lawton, Berkeley, Calif., assignors to Shell Development Company, San Francisco, Calif., a corporation of Delaware No Drawing. Application March 27, 1939, Serial No. 264,482

2 Claims. (Cl. 166—21)

This invention pertains to the art of treating oil wells to increase their production, and relates more specifically to the removal of clogging deposits of paraffinic, asphaltic, waxy and similar nature by means of an exothermic process involving the oxidation of organic reducing compounds.

Many processes have already been proposed to melt and remove obstructing paraffin wax deposits from oil wells by the heat-generating interaction of such agents as, for example, a strong acid and a caustic alkali, or a comminuted metal, an oxidizing compound and a caustic alkali.

These processes, however, often fail to generate an amount of heat sufficient to clean the well, and also often have the disadvantage of causing formation of insoluble precipitates by the interaction of the reagents used with the calcium and magnesium ions generally present in well brines, whereby the formation is further clogged, and the production of the well reduced.

It is, therefore, an object of this invention to provide a method for treating clogged oil wells by means of agents capable of developing a large amount of heat which is sufficient for complete removal of the obstructing deposits of the paraffinous, waxy, or asphaltic nature.

It is another object of this invention to provide for said treatment a heat generating process carried out in the presence of, or immediately followed by the application of a solvent capable of readily dissolving the paraffin wax at temperatures near its melting point, whereby said wax as well as the products of the heat-generating reaction, are removed from the well and are prevented from clogging the formation by solidifying on cooling. Other objects will be apparent as the invention is hereinafter more fully described.

The process of the present invention consists broadly in generating heat within the well by means of an exothermic reaction involving the oxidation of organic reducing compounds by inorganic oxidizing compounds. This may be effected by oxidizing organic reducing compounds by the nascent oxygen evolved by the decomposition of inorganic peroxides in aqueous solution according, for example, to the following equation:

$$Na_2O_2 + 2H_2O \rightarrow 2NaOH + H_2O_2 + \text{heat}$$
$$2H_2O_2 \rightarrow 2H_2O + O_2(\text{nascent}) + \text{heat}$$
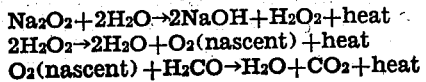

or by oxidizing organic reducing compounds by inorganic oxidizing compounds in an acid solution, according, for example, to the following equation:

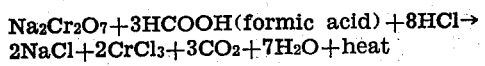
$$2NaCl + 2CrCl_3 + 3CO_2 + 7H_2O + \text{heat}$$

As organic reducing agents suitable for the present process, the following substances may be used: soluble carbohydrates such as monosaccharides, e. g., glucose, disaccharides, e. g., sucrose, polysaccharides, etc.; aldehydes such as formaldehyde, acetaldehyde, propionaldehyde, etc.; primary, secondary, mono, or polyhydric alcohols of relatively low molecular weight such as propyl alcohol, secondary butyl alcohol, glycerin, etc.; saturated monobasic or polybasic carboxylic acids of relatively low molecular weight such as formic acid, oxalic acid, lactic acid, tartaric acid, citric acid, etc., or their derivatives such as bromoacetic, trichloroacetic, aminoacetic acids, etc. However, the oxygen-containing organic reducing agents are preferred as these yield a greater amount of heat upon oxidation.

As inorganic oxidizing agents suitable for the present process, the following substances may be used: peroxides such as metal peroxides, hydrogen peroxide, etc., and water soluble metal nitrates, chlorates, perchlorates, chromates, dichromates, permanganates, and persulfates.

As solvents suitable for use in conjunction with the present process, the following solvents may be used: Carbon tetrachloride, benzene, gasoline, kerosene, kerosene extract, tetralin, ketones, such as acetone, methyl ethyl ketone, etc.

In treating a well by the process of the present invention, the following procedure may be followed:

A sample of the paraffin wax deposits is obtained from the well and subjected to tests to determine its melting point and the type of solvent especially effective in dissolving it at temperatures near its melting point. The melting points of paraffin waxes from oil wells usually fall within a temperature range of from 50° C. to 95° C.

The well is then bailed or pumped until free of liquid, and a suitable amount of the desired solvent is placed in the well, the quantity of said solvent being preferably in excess of that anticipated as necessary to dissolve the wax deposits which it is desired to remove from the well. The heat generating reagents are then introduced into the well in any desired manner. For example, a preferred method consists in pumping down the well or placing at the bottom thereof by means of a bailer or other suitable device an aqueous solution of an organic reducing agent, such as, for example, formaldehyde, and followed by lowering an inorganic peroxide, such as, for example, $Na_2O_2$, in solid form, in a suitable container. The decomposition of the inorganic peroxide may be catalyzed by the addition of a small amount of a ferric salt to the aqueous solution, whereby more heat is liberated and the evolution of heat is more rapid. Another method may comprise introducing into the bottom of the well an aqueous solution of an inorganic oxidizing agent, such as, for example, $Na_2Cr_2O_7$ together with an acid, and lowering the desired organic reducing agent, e. g., sucrose, by means of suitable containers. The heat-generating chemicals are agitated during their interaction to insure uniform distribution of the heat evolved. The perforations of the liner may be washed or swabbed, if desired, to secure more complete removal of the wax accumulation.

The amount of the reagent used is calculated so as to raise the fluid level above the top of the producing formation, and so as to generate an amount of heat in excess by at least 50% over that estimated as necessary to give the desired raise in temperature, whereby the effect of heat losses due to conduction into the formation is neutralized, and the temperature of the fluid in the well is raised above the melting point of the paraffin wax. In calculating the amount of the reagents and of the solvent used, reference may be had to Tables I and II, given hereinbelow.

The hot solution is allowed to remain in the well for a sufficiently long time, for example, from 2 to 8 hours, to insure that all the paraffin wax has been melted and has been dissolved by the solvent and is then removed by bailing, swabbing or pumping, before the temperature becomes low enough to cause the paraffin wax to solidify again.

It is inadvisable to force the hot solvent into the formation by applying pressure at this stage, since the resulting cooling of the solvent, more or less saturated with the wax, may cause a plugging of the formation. It is therefore preferable to remove the wax together with the hot solvent from the well, and to follow this procedure by a second treatment with a cold wax solvent to be forced into the formation, if the latter step appears necessary.

In using inorganic peroxides as oxidizing agents, care should be taken to control the amount of peroxide under that required to cause ignition. It is not desirable to have a flame present in an oil well, as complete combustion of hydrocarbon substances such as oil, wax and asphalt may leave a gummy or solid residue on the formation surface which plugs the formation, preventing the flow of oil into the well from the formation. The flame will melt the wax, allowing the melted wax to cover the formation surface, where it may recongeal before it can be removed, resulting in a more complete shutoff of the formation, unless the entire formation is covered with the treating mixture. A flame may fuse the surface of the formation, with the resultant closing of the pores, and complete plugging of the formation. Also, the flame may cause severe corrosion of the metal equipment, or may even burn off several lengths of pipe, which can be replaced only at great expense.

The amounts of heat generated by using varying proportions and concentrations of reagents are shown in Table I, and may be used in calculating the actual quantities of said reagents necessary for an effective treatment.

Table I

| Composition No. | Reagents by weight | Heat evolved in B.t.u./lb. of composition |
|---|---|---|
| 1 | 10 parts $Na_2O_2$, 100 parts $H_2O$ | 47.6 |
| 2 | 10 parts $Na_2O_2$, 20 parts sucrose, 100 parts $H_2O$. | 140.5 |
| 3 | 10 parts $Na_2O_2$, 10 parts glycerine, 90 parts $H_2O$. | 131.8 |
| 4 | 10 parts $Na_2Cr_2O_7.2H_2O$, 10 parts sucrose, 107.4 parts 15% HCl. | 81.5 |
| 5 | 5 parts $KMnO_4$, 10 parts NaOOCH, 100 parts 25% $H_2SO_4$. | 81.3 |
| 6 | 10 parts $Na_2Cr_2O_7.2H_2O$, 10 parts sucrose, 100 parts $HNO_3$ (sp. gr. 1.138). | 87.9 |

Table I shows that compositions 2–6 used according to the present invention evolve a considerably greater amount of heat per pound of composition used than, for example, composition No. 1, where the reaction between peroxide and water is not carried out in the presence of an organic reducing agent.

The amounts of reagents which may actually be used according to the present invention to obtain a desired increase of temperature in a well are shown in Table II, which refers, by way of example, to the treatment throughout about 100 to 125 feet of a producing sand, depending on the amount and nature of the wax accumulation, of a well having a 6 inch casing. These compositions include sufficient reagents to evolve 50% excess heat for melting the paraffinic manner and for heat losses to the formation.

Table II

| Composition No. | Composition | Well temperature increase °C. |
|---|---|---|
| 7 | 117 lbs. $Na_2O_2$, 93 lbs. sucrose, 1 bbl. 0.05% $FeCl_3$, 4 bbl. gasoline. | 50 |
| 8 | 92 lbs. $Na_2O_2$, 74 lbs. sucrose, 1 bbl. 0.05% $FeCl_3$, 4 bbl. gasoline. | 40 |
| 9 | 42 lbs. $Na_2Cr_2O_7.2H_2O$, 85 lbs. sucrose, 1 bbl. 15% HCl, 4 bbls. gasoline. | 40 |
| 10 | 70 lbs. $Na_2Cr_2O_7.2H_2O$, 140 lbs. sucrose, 1.5 bbl. 15% HCl, 3 bbls. gasoline. | 60 |

Although for the sake of brevity the examples given herein have been used merely to illustrate the application of the present process to the removal of wax deposits in oil wells, laboratory and field tests show that the same results are obtainable by the use of the other inorganic oxidizing agents and organic reducing agents specified for use in the present process.

We claim as our invention:

1. In the process of cleaning wells from organic deposits comprising paraffinic matter, the steps of introducing thereinto an acidic treating mixture comprising an oxygen-containing organic reducing compound and an inorganic oxidizing compound, causing the heat generated without evolution of flames within the well by the interaction of said compounds in acid reaction to melt said deposits, and removing from the well the deposits melted by said heat.

2. In the process of cleaning wells from high melting organic deposits comprising paraffinic matter, the steps of introducing thereinto an acidic treating mixture comprising an oxygen-containing reducing compound, an inorganic oxidizing compound capable of reacting with said reducing compound to generate heat within the well, and a solvent, causing the heat generated without evolution of open flame within the well by the reaction between said compounds to melt said deposits, allowing the melted matter to dissolve in the solvent, and removing the solvent and the dissolved paraffinic matter from the well.

DONALD A. LIMERICK.
HOWARD C. LAWTON.